Jan. 12, 1954
A. S. PARKS
2,665,565
SEPARATOR
Filed July 2, 1951
2 Sheets-Sheet 1
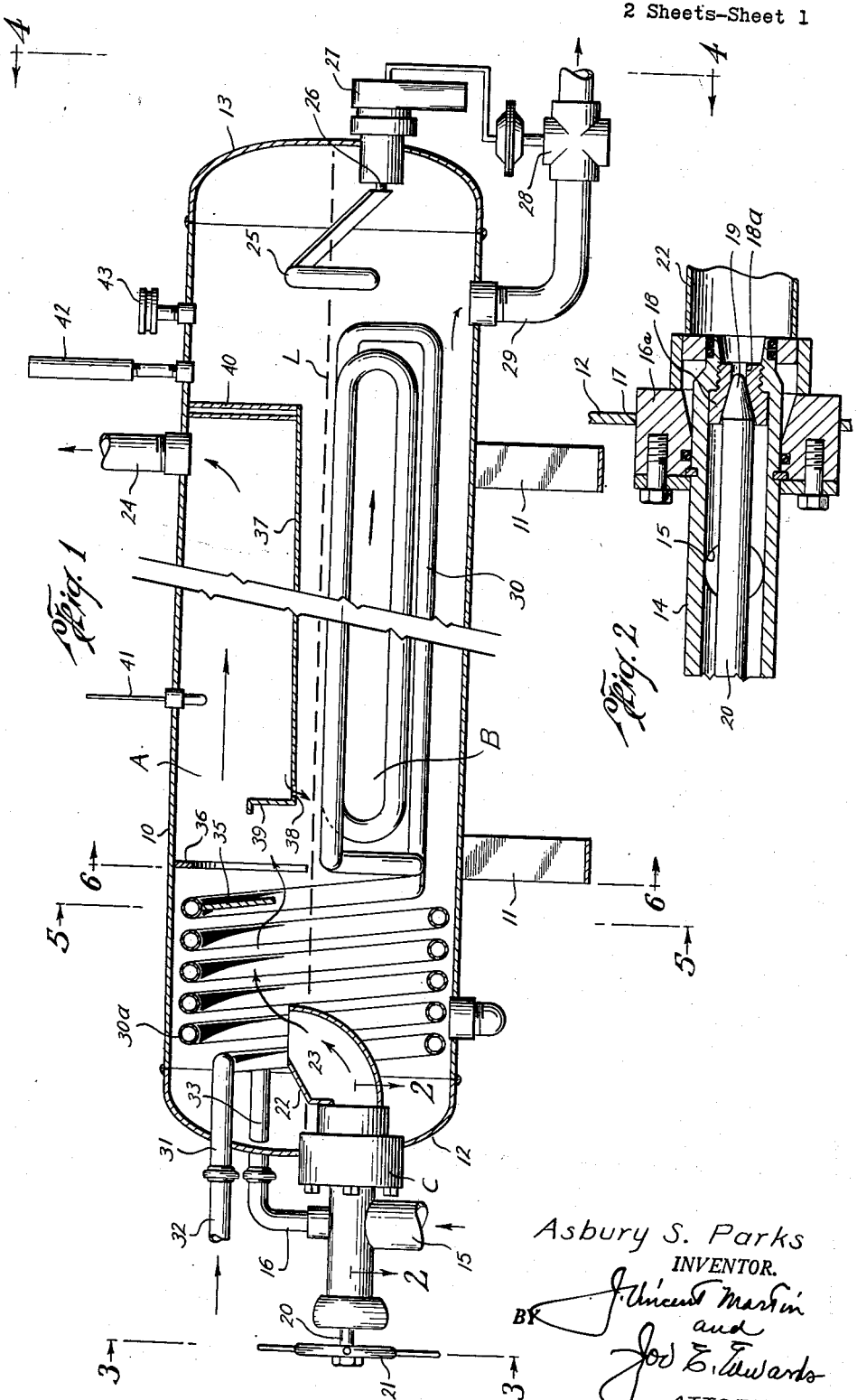
Asbury S. Parks
INVENTOR.
BY
ATTORNEYS

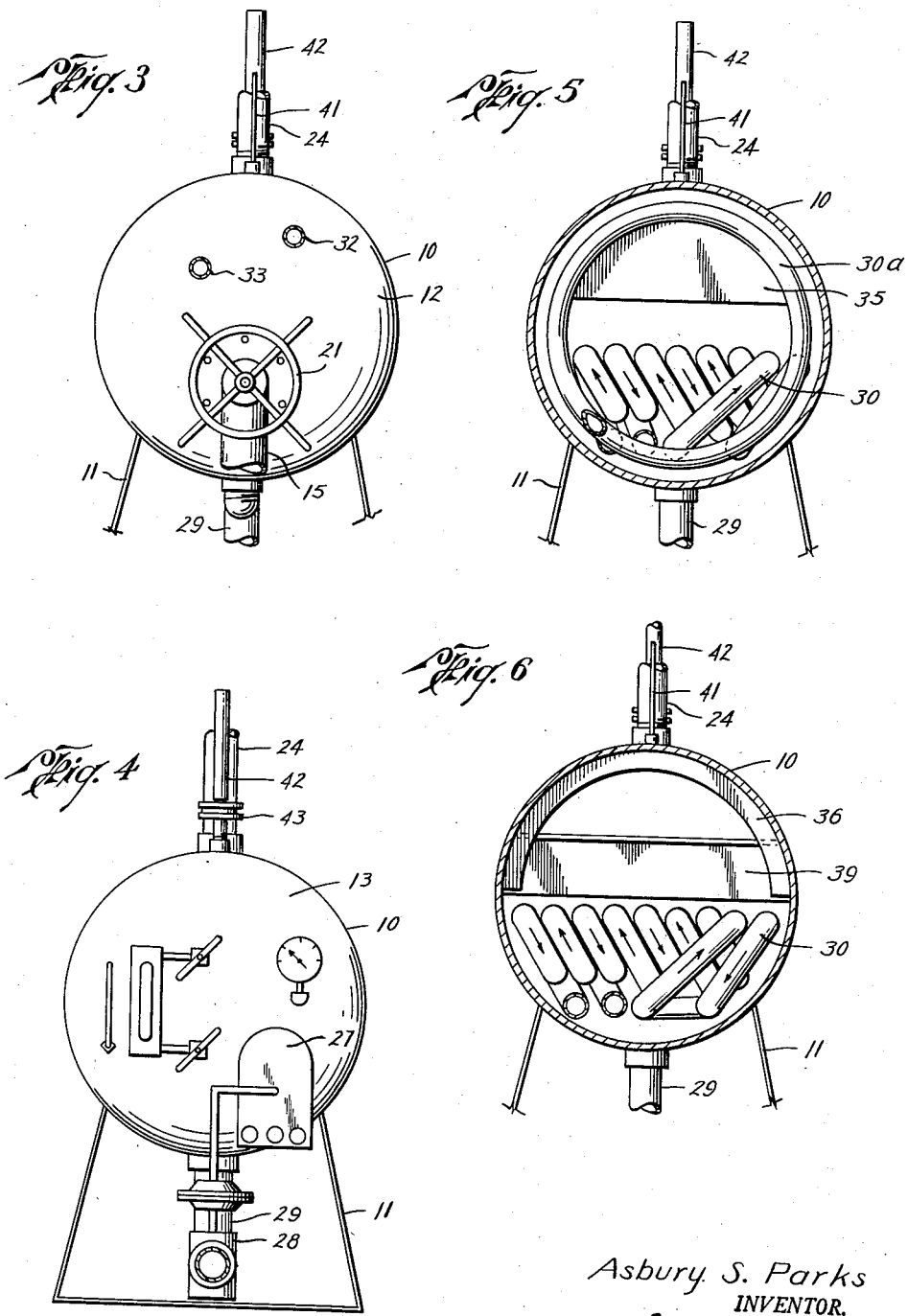

Patented Jan. 12, 1954

2,665,565

UNITED STATES PATENT OFFICE 2,665,565

SEPARATOR

Asbury S. Parks, Houston, Tex.

Application July 2, 1951, Serial No. 234,791

11 Claims. (Cl. 62—122)

This invention relates to new and useful improvements in separators and relates particularly to low temperature separators for separating liquids from high pressure gas streams.

The invention comprises an improvement upon the separator vessel disclosed in the patent to Arthur F. Barry, No. 2,528,028, issued October 31, 1950. In such prior patent a method and apparatus is illustrated wherein free water is first removed from the high pressure well stream, after which separation of the liquids and gas is carried out in a separator vessel under extremely low temperatures well below the expected hydrate formation point, whereby increased recovery of liquid hydrocarbon components and removal of increasing amounts of water from the gas, is accomplished.

Specifically, it is one object of this invention to provide a separator vessel of the horizontal type which is adaptable for use in the apparatus and method disclosed in the aforesaid Barry patent.

An important object of the invention is to provide a horizontal separator which is constructed to increase hydrocarbon liquid recovery from high pressure gas streams, improve dehydration of the gas and at the same time produce a more stable liquid product composed of the recovered or separated hydrocarbons.

Another object is to provide a horizontal separator, wherein the contact between the gas flowing through the separator and the hydrates formed in the cold zone of said separator is enhanced whereby full advantage is taken of the hydrate crystals acting as an absorbent for the water vapor in said gas to improve the dehydration of the gas.

A further object is to provide a horizontal separator wherein a cold zone and a warm zone are maintained within the vessel, and also wherein the liquid within the warm zone is utilized to impart heat to the pressure-reducing device of the separator, whereby "freezing up" of said device is prevented even under low rates of flow.

Still another object is to provide a separator, of the character described, wherein the accumulation of hydrate crystals upon surfaces against which the cold gas stream may impinge is obviated to assure continuous operation of the separator.

Another object is to provide a horizontal separator vessel wherein efficient separation of the liquid and gas is effected to obviate a carry over of liquid into the gas discharge line; said separator also being arranged to locate the float mechanism which controls liquid discharge from the vessel within the warm zone of the vessel and completely out of the path of the gas stream or precipitating hydrates to assure proper operation of said mechanism at all times.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is a longitudinal sectional view of a separator, constructed in accordance with the invention, Figure 2 is a longitudinal sectional view taken on the line 2—2 of Figure 1, Figure 3 is an end elevation taken from the inlet end of the vessel, Figure 4 is an end elevation viewing the vessel from the outlet end thereof, Figure 5 is a transverse sectional view taken on the line 5—5 of Figure 1, and Figure 6 is a transverse sectional view taken on the line 6—6 of Figure 1.

In the drawings, the numeral 10 designates a cylindrical vessel which is adapted to be supported with its longitudinal axis in a horizontal plane on suitable leg members of supports 11. The ends of the vessel are closed by dome-shaped end covers or plates 12 and 13 which are welded or otherwise secured to the vessel. As will be explained, the upper portion of the vessel comprises a cold zone generally indicated at A while the lower portion of the vessel forms a warm zone B. A high pressure gas stream is adapted to be introduced through an inlet assembly C which is mounted in the end closure or plate 12.

The high pressure gas stream, under its pressure and temperature, is saturated with water and hydrocarbon components in the vapor phase and may also contain hydrocarbons in the liquid phase. Such a stream is one which may be conducted from a high pressure gas distillate well, from which free liquid water has been removed. This stream which will be hereinafter referred to as a gas stream is conducted to the inlet assembly which, as is clearly shown in Figure 2, comprises a tubular body 14 having a radial inlet 15 connected with the inlet line 16. The inner end of the body is supported within a suitable block 16a welded or otherwise secured within an opening 17 in the end closure 12 and the extreme inner end of the body is provided with an annular valve seat 18. An adjustable pressure reducing regulator or choke 19 is movable with respect to the seat to control flow through the opening 18a in the seat and by adjusting the choke with respect to the seat, it is evident that a desired pressure drop may occur as the gas stream flows into the vessel. The choke is carried by a suitable stem 20 which extends outwardly from the outer end of the body and has a suitable hand wheel 21 which facilitates manual adjustment of said choke with respect to the seat.

Beyond the tubular body 14 of the inlet assembly, a deflector element or box 22 is provided, and as is clearly shown in Figure 1, said box has a discharge 23 at its upper end which directs the flow of the incoming stream in an upward direction within the interior of the vessel. The deflector element or box, as well as the inner end of the tubular body 14, are disposed within the warm zone B and only the upper portion of the box or deflector extends upwardly into the cold zone A of the vessel.

The choke member 19 is provided for the purpose of reducing the pressure of the gas stream to a point which will cause cooling of the stream below the normal hydrate formation point. The gas stream flowing into the inlet assembly C is usually under relatively high pressures in the order of 3,000 to 4,000 pounds, and in passing around the adjusted choke member, the pressure is reduced downwardly to a pressure in the order of 1,000 pounds. This pressure reduction results in cooling the stream to a point below that at which hydrates will form so that as the stream is introduced into the deflector or box 22 and then discharged into the upper portion of the vessel, the low temperature creates the cold zone A within the interior of said vessel. The hydrates which are formed in the stream by the extreme cooling action as well as the hydrocarbon components which are liquefied as a result of said cooling enter the cold zone A at the inlet end of the vessel and then precipitate downwardly from the cold zone into the warm zone B. The cold gas from which the hydrates and condensed liquids precipitate then flows longitudinally within the cold zone A and escapes therefrom through a gas outlet pipe 24 which extends from the upper end of the vessel.

It is important to the present invention that the pressure reduction effected by the choke 19 be sufficient to lower the temperature of the stream well below the hydrate formation point and thus, the water within the stream is condensed and hydrates are formed. The extreme cooling so effected results in the condensation of certain of the hydrocarbon components and thus, additional separation of such hydrocarbon components is effected.

Since the pressure reduction and the cooling caused thereby is effected at the choke 19, there may be a tendency, particularly under low flow rates, for freezing to occur in the choke orifice 18a formed within the valve seat 18. However, since the choke orifice as well as the choke member are disposed within the warm zone, a heat exchange will occur which will defeat freezing at the point of reduction. It is well known that as a cold gas stream containing hydrates is impinged upon a surface, there is a tendency for the hydrates to accumulate and build up on that surface, which means that ordinarily there would be a tendency for hydrates to accumulate on the inner curved wall of the deflector or box 22; however, since the major portion of this deflector or box is disposed within the warm zone B of the vessel, the wall of the deflector or box is maintained sufficiently warm to prevent excessive accumulation of hydrates within the interior of said deflector or box.

As the cold gas stream having liquefied hydrocarbon components and hydrates therein travels longitudinally through the cold zone A within the upper portion of the vessel, the hydrates and hydrocarbon liquid components precipitate downwardly into the warm zone and a body of liquid is maintained within this warm zone. This body of liquid, the level L of which is indicated in Figure 1, is controlled by a suitable float 25. The float has connection through a torque tube 26 with a pilot pressure control unit 27, which unit controls the application of pressure to a pressure actuated discharge valve 28. The valve 28 is connected in a discharge line 29 extending from the bottom of the vessel, and it will be obvious that the float 25 controls opening and closing of the valve 28 to maintain a desired liquid level within the warm zone B of the vessel.

The liquid body within the vessel is heated by means of a suitable heating coil 30 which is disposed within the major portion of the warm zone. Adjacent the inlet end of the vessel the heating coil 30 includes enlarged diameter coils 30a, a portion of which extend into the cold zone A of the vessel adjacent the inlet or discharge opening 23 of the deflector element or box 22. The inlet end 31 of the coil is connected to a supply line 32. The line 32 may be connected with the source of the high pressure gas stream so that the high pressure gas stream is circulated through the coil 30. As shown in Figure 1 the outlet 33 of the heating coil has connection with the inlet line 16 extending to the inlet assembly C. With this arrangement the high temperature of the high pressure gas stream is utilized to supply heat to the body of liquid within the vessel, after which the stream is conducted through the assembly C and introduced into the cold zone of the vessel. However, it is pointed out that the inlet 31 and outlet 33 of the heating coil may be connected to any suitable source of heating fluid, in which event the inlet line 16 would be directly connected to the high pressure gas stream.

As the incoming cold gas stream having hydrates and liquefied hydrocarbon components therein discharges into the cold zone A and begins its longitudinal travel through said zone, it is desirable to impede or reduce the velocity of flow in order to assure sufficient time for precipitation of hydrates and liquids. For this purpose a transverse baffle 35 is mounted within the zone A and is shown as extending across one of the coils 30a of the heating coil assembly. By connecting the baffle 35 to the coils 30a, the baffle is maintained at a temperature which will prevent the accumulation of hydrates thereon, which accumulation might result because the gas stream impinges directly against the baffle. The baffle thus functions to slow the velocity of the stream to assure that the hydrates will precipitate into the liquid body within the warm zone B. To prevent any liquid which may pass through the space between the coils 30a and the inner wall of the vessel from splashing horizontally, a semi-circular baffle 36 is secured to the inner wall of the vessel beyond the coils 30a. The area between the deflector 22 and the baffle 36 might be termed the initial separation zone since it is within this area that the major portion of the hydrates and liquids precipitate downwardly into the warm zone B.

Beyond the initial separation area, a longitudinally extending tray 37 is disposed within the vessel. This tray extends transversely across the vessel and provides a partition between the portion of the cold zone A and the warm zone B. The tray is preferably slightly inclined in a horizontal plane and is formed with a drain opening 38 at its lower end; adjacent this drain opening is an upstanding transverse baffle 39. That end of the tray opposite the baffle 39 terminates just beyond the gas outlet 24 and a partition or wall 40 which may be insulated in any suitable manner extends between the tray and the inner wall of the vessel.

It will be evident that after the gas stream passes around the baffles 35 and 36, it flows toward the gas outlet 24 and passes over the tray 37. Any further liquids or hydrates which are precipitated from the gas stream will drop downwardly onto the tray and due to its inclination will tend to flow toward the drain opening 38. Actually, some hydrates will accumulate on the upper surface of the tray 37 to form a layer thereon and subsequent flowing gas contacts this layer accumulated hydrates whereby the hydrate crystals act to absorb additional water vapor which might still be entrained in the gas. The layer of hydrates upon the tray functions as an insulation to prevent the transfer of heat into the cold zone A but when this layer reaches a predetermined thickness, the insulating effect is increased to the point that the under surface of the tray 37 which is in close proximity to the warm body of liquid in the lower portion of the vessel will be warmed by the heat from the body of liquid. Such warming will melt or liquefy these hydrate crystals in direct contact with the tray, and the liquefied hydrates will escape through the drain opening 38; of course, as soon as the thickness of the layer of hydrates has been reduced by melting of a portion thereof, the insulating effect is also reduced and the tray 37 is again cooled to halt or reduce the further melting. In this manner, a predetermined layer of hydrate crystals is maintained on the tray for contact with the flowing gas to increase dehydration without excessive accumulation of said hydrates.

It is noted that the float 25 operates within the cold zone A and because of the partition 40 there is no possibility of hydrates accumulating on the float to interfere with its operation. A suitable thermometer 41 may be mounted in the cold zone A and also a relief valve 42, as well as a safety head 43, may be connected in the vessel.

It is believed that the operation of the separator is obvious from the foregoing. The warm body of liquid which creates the warm zone B is maintained in the lower portion of the vessel and above the liquid level the cold zone A is formed because of the extremely low temperature of the stream. As the gas stream is introduced through the choke 19, it impinges against the deflector or box 22 and is discharged in an upward direction at the inlet end of the cold zone A. Freezing at the choke or accumulation of hydrates in the deflector or box is prevented by the constant heat exchange between the warm body of liquid and the inner end of the inlet assembly C.

As the cold gas stream having hydrates and condensed liquids therein enters the inlet end of the cold zone A, it impinges against the baffle 35 which slows the velocity of the stream sufficiently to permit precipitation of the hydrates and liquids into the warm zone of the vessel. Accumulation of hydrates upon the baffle 35 is prevented because there is sufficient heat exchange between the coil and the baffle to prevent such accumulation. The gas stream then passes over the baffle 39 at the end of the longitudinal tray 37 and during its flow through the cold zone beyond the baffle, further precipitation of liquids and hydrates will occur. The layer of hydrate crystals which accumulate on the upper surface of the tray 37 provides an elongate layer of such crystals which are contacted by the flowing gas. It has been found that by enhancing or increasing the contact of the cold gas with the hydrate crystals, such crystals act as an absorbent for the water vapor in the gas and therefore water vapor which would otherwise be carried over through the gas outlet is removed from the gas to improve the dehydration thereof. The hydrate crystals can build up on the tray 37 so long as the temperature of the tray is below the melting point of said hydrates; however, as the hydrates build up the layer or coating acts as an insulator of heat which then allows the material of the tray to become warmed by the liquid body adjacent its under surface, and this results in the bottom of the hydrate layer beginning to melt. When this occurs the melted or liquefied portion of the hydrates flows through the drain opening 38 and downwardly into the liquid body. It may thus be said that the arrangement provides for a control of the layer of hydrates which can form on the tray.

From the foregoing it will be evident that the cold gas has contact with hydrate crystals within the initial separating area, while the hydrates are precipitating downwardly through the gas and then has additional contact with hydrates as it flows over the tray to assure removal of a maximum amount of water from the gas.

The precipitated liquid drops downwardly from the initial separating area and flows in a direction toward the liquid outlet line 29 during which time it contacts the heating coil 30. It is evident that the temperature of the liquid increases with its travel longitudinally toward the outlet, and as it becomes warmed the lighter hydrocarbons vaporize. These vapors leaving the upper surface of the body of liquid rise upwardly into contact with the under side of the tray 37, which is colder than the liquid body from which the vapors evolved, thereby resulting in a recondensation of the vapors and a falling back of such condensate into the warm liquid. The general movement of vapors toward the liquid body is back toward the inlet of the vessel. Thus, there may be numerous vaporization and condensation cycles before the final vapor reaches the entry end of the tray 37 where it joins the gas stream leaving the vessel. It is therefore evident that as the liquid travels longitudinally through the vessel it is effectively fractionated with the result being a drier gas from the heated liquid and a more effective retention of the light ends in the final liquid. This means that the final product withdrawn from the discharge line 29 is a more stable product, since all of those lighter ends which would tend to vaporize and escape have been effectively removed.

The float 25 is located in the warmer portion of the liquid body and by reason of the separating partition 40, the gas area above the float is at substantially the same temperature as the liquid body. This assures proper operation of the float since condensation on the float due to its being cooled by contact with cold gas is prevented.

Having described the invention, I claim:

1. A separator including, a horizontal vessel having means for creating a cold zone in its upper portion and also having means for creating a warm zone in its lower portion, a well stream inlet at one end of the vessel, a gas outlet at the opposite end of the vessel and extending from the cold zone whereby the well stream is caused to travel longitudinally of the vessel, means in advance of the inlet through which the well stream is directed for cooling the well stream to condense liquids and form hydrates which upon flowing longitudinally through the vessel precipitate downwardly into the warm zone, and means maintaining a predetermined liquid level in the warm zone, said well stream inlet having a deflector means associated therewith which is disposed at least partially within the liquid in the warm zone to prevent the accumulation of hydrates at said inlet.

2. A separator including, a horizontal vessel having means for creating a cold zone in its upper portion and also having means for creating a warm zone in its lower portion, a gas stream inlet at one end of the vessel for introducing a high pressure gas stream into the cold zone, means in advance of the inlet through which the well stream is directed for cooling the stream to condense liquids and form hydrates which upon flowing longitudinally through the cold zone precipitate downwardly into the warm zone, a longitudinal baffle tray extending transversely within the vessel and disposed partially between the cold zone at the lower portion of the cold zone and the warm zone for mechanically separating the zones throughout the length of the baffle, a gas outlet extending from the cold zone at the end opposite the inlet, and a liquid outlet extending from the warm zone at the end opposite the inlet.

3. A separator as set forth in claim 2, wherein the means for cooling the stream is a pressure-reducing device which is disposed to be warmed by the heat within the warm zone whereby freezing at said device is prevented.

4. A separator including, a horizontal vessel having means for creating a cold zone in its upper portion and a warm zone in its lower portion, a gas stream inlet at one end of the vessel for introducing a high pressure gas stream into the cold zone, means in advance of the inlet for cooling the stream to condense liquids and form hydrates which upon flowing longitudinally through the cold zone precipitate downwardly into the warm zone, a longitudinal baffle tray extending transversely within the vessel and disposed partially between the cold zone and the warm zone at the lower portion of the cold zone for mechanically separating the zones throughout the length of the baffle, a gas outlet extending from the cold zone at the end opposite the inlet, a liquid outlet extending from the warm zone at the end opposite the inlet, and means for maintaining a predetermined liquid level within said warm zone.

5. A separator as set forth in claim 4, wherein the means for cooling the stream is a pressure-reducing device which is disposed to be warmed by the liquid in the warm zone, whereby freezing at said device is prevented.

6. A separator including, a horizontal vessel having means for creating a cold zone in its upper portion and a warm zone in its lower portion, a gas stream inlet at one end of the vessel for introducing a high pressure gas stream into the cold zone, means at the inlet for cooling the stream to condense liquids and form hydrates which upon flowing longitudinally through the cold zone precipitate downwardly into the warm zone, a longitudinal baffle tray extending transversely within the vessel and disposed partially between the cold zone and the warm zone at the lower portion of the cold zone for mechanically separating the zones throughout the length of the baffle, a gas outlet extending from the cold zone at the end opposite the inlet, a liquid outlet extending from the warm zone at the end opposite the inlet, and a liquid level controller having means within the warm zone of the vessel and responsive to the liquid level within said zone for maintaining a predetermined liquid level in said zone.

7. A separator including, a horizontal vessel having means for creating a cold zone in its upper portion and a warm zone in its lower portion, a gas stream inlet at one end of the vessel for introducing a high pressure gas stream into the vessel, deflector means extending from the inlet disposed within the warm zone and having a discharge discharging the incoming stream into the cold zone, means at the inlet for reducing the pressure of the stream to a point which will condense liquids and form hydrates, said liquids and hydrates being directed by the deflector means into the cold zone with the flowing gas stream, whereby said liquids and hydrates may precipitate downwardly into the warm zone, a heating coil within the warm zone of the vessel for maintaining the temperature of the warm zone above the hydrate formation point to liquefy the hydrates, a gas outlet extending from the cold zone of the vessel at that end of the vessel opposite the inlet, and a liquid outlet extending from the warm zone at the end opposite the inlet.

8. A separator as set forth in claim 7, together with means for connecting one end of the heating coil to a high pressure gas stream line, and means for connecting the opposite end of the coil to the inlet, whereby the temperature of the high pressure gas stream prior to its passage through the pressure reducing means at the inlet functions to heat the warm zone within the vessel.

9. A separator as set forth in claim 7, wherein a portion of the heating oil extends into the cold zone adjacent the discharge of the deflector means to prevent accumulation of hydrates upon any surfaces within the vessel against which the incoming cold gas stream liquids and hydrates impinge.

10. A separator as set forth in claim 7, together with a liquid level controller having means within the warm zone of the vessel and responsive to the liquid level within said warm zone for maintaining a predetermined liquid level within said warm zone.

11. A separator as set forth in claim 7, together with a longitudinal baffle tray disposed within the vessel and extending partially between the cold zone and the warm zone for mechanically separating the zones throughout the length of the tray, said tray providing an area on its upper surface for the accumulation of hydrates which are contacted by the gas flowing to the gas outlet, said tray having means for discharging hydrates downwardly from the tray into the warm zone.

ASBURY S. PARKS.

References Cited in the file of this patent

UNITED STATES PATENTS

| Number | Name | Date |
|---|---|---|
| 2,409,458 | Van Nuys | Oct. 15, 1946 |
| 2,482,304 | Van Nuys | Sept. 20, 1949 |
| 2,528,028 | Barry | Oct. 31, 1950 |